Aug. 6, 1963 T. H. MARSHALL 3,100,075
EASY-OPEN TELESCOPING CARTON FOR SAUSAGE CASINGS
Filed Dec. 17, 1958 2 Sheets-Sheet 1
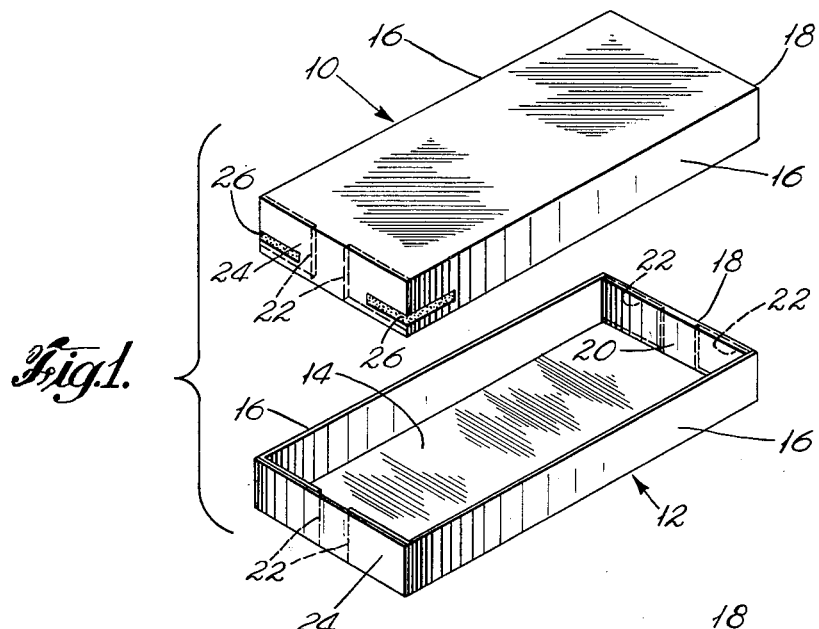
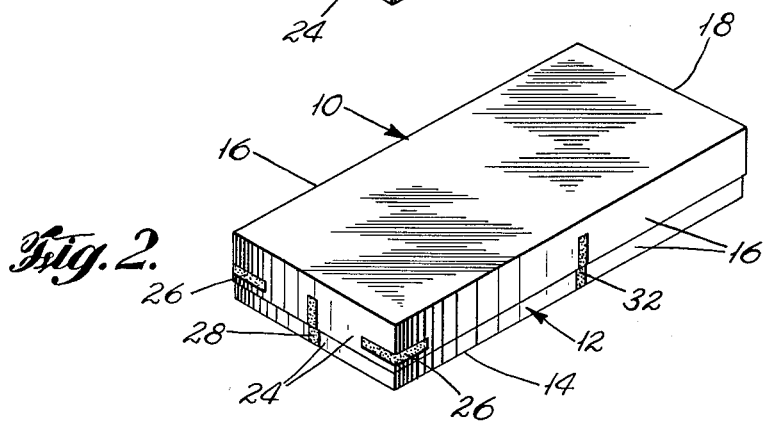
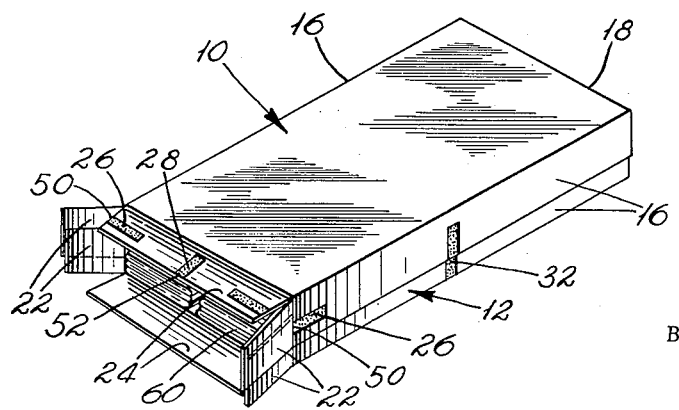
INVENTOR.
THEODORE H. MARSHALL
BY
ATTORNEY Aug. 6, 1963 T. H. MARSHALL 3,100,075
EASY-OPEN TELESCOPING CARTON FOR SAUSAGE CASINGS
Filed Dec. 17, 1958 2 Sheets-Sheet 2
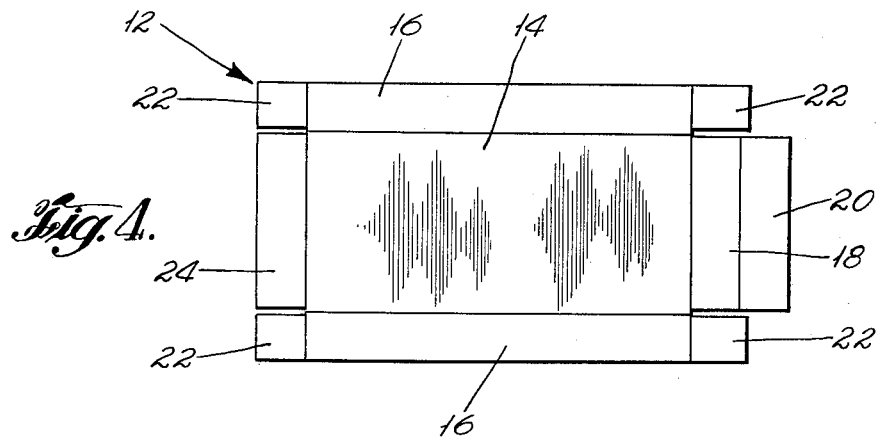
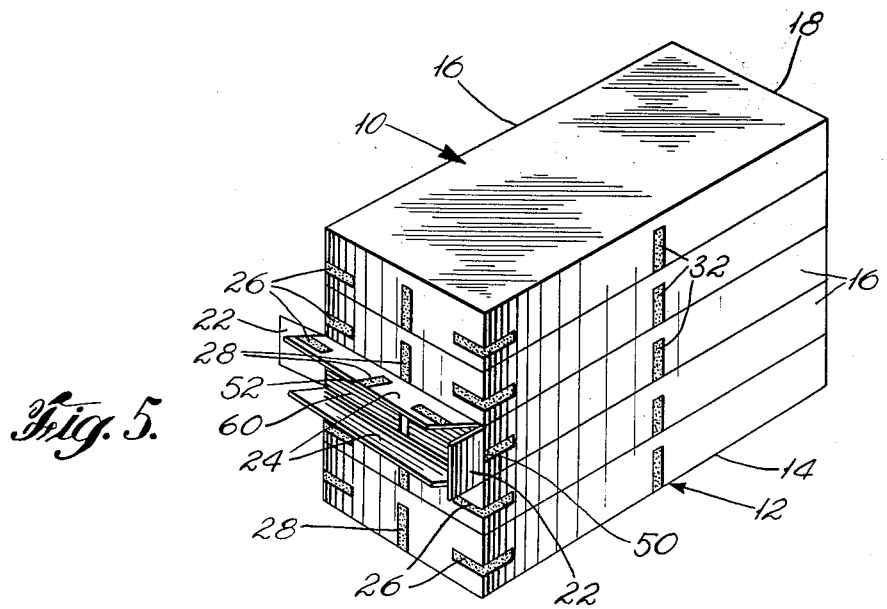
INVENTOR.
THEODORE H. MARSHALL

United States Patent Office 3,100,075
Patented Aug. 6, 1963

3,100,075
EASY-OPEN TELESCOPING CARTON FOR SAUSAGE CASINGS
Theodore H. Marshall, Oak Lawn, Ill., assignor to Union Carbide Corporation, a corporation of New York
Filed Dec. 17, 1958, Ser. No. 781,080
4 Claims. (Cl. 229—51)

This invention relates to a telescoping shipping and storage carton having an easy-open end. More particularly it relates to a telescoping carton for flattened sausage casings having an easy-open end for providing access to the contents thereof.

Cellulosic sausage casings known in the trade as large casings, distinguished from shirred and compressed frankfurter size casings, are sold in sizes which range in diameter from 1⅝" to 6¾", and in lengths which range from 8" to 96".

Such casings are sold in a dried and flattened condition. They are usually wrapped in kraft paper in unit groups of 125, 250 or 500 pieces each. The 125 piece unit packages of each specific size and length of casings are assembled for shipping into corrugated cartons. Depending on dimensions of the casings, such cartons may each accommodate from 500 to 10,000 pieces of casing.

The present practice of food casing manufacturers is to use conventional half-slotted and full overlap corrugated shipping cartons of several different heights. The wide range of casing sizes and lengths supplied to the customers of one such manufacturer, demands stocking an inventory of about 100 different sizes of shipping cartons to meet packaging requirements. Such a diverse inventory of large numbers of shipping carton sizes, presents a costly and complex problem of supply, warehousing and servicing.

Packers employing the casings generally store their inventory of sausage casings in the shipping cartons, which are stacked in vertical piles with ends exposed. Withdrawal of several hundred casings from a conventional top opening carton or cartons near the bottom of a stack is a labor-consuming and annoying procedure for obvious reasons.

With presently available cartons, the food casing manufacturer must maintain an extremely large inventory of various size cartons to meet the requirements of customers' individual orders and at the same time, the food processor or customer who generally keeps a large inventory of various size casings is faced with the problem of getting at the contents of individual cartons with a minimum of time and effort. It may thus be seen that a carton adjustable to accommodate different quantities and sizes of sausage casings, and whose contents can be readily removed even though the carton is stacked in a pile with like cartons will overcome the aforementioned undesirable features of the prior art.

It is accordingly an object of the present invention to provide a telescoping carton for food casings which will accommodate a plurality of different sizes of casings and quantities thereof.

It is a further object to provide such a carton with an easy-open end whereby the contents may be easily removed through such end when the carton is stacked anywhere in a pile of similar or diverse cartons.

It is a still further object to provide a carton having the above characteristics which will be simple in design and inexpensive to manufacture.

Other objects and advantages will be apparent from the description and drawings in which:

FIG. 1 is an exploded view of a telescoping carton and showing the two components thereof.

FIG. 2 is a perspective view of the carton sealed and ready for shipment.

FIG. 3 is a detailed view showing the easy-open end feature of the carton.

FIG. 4 is a plan view of a cardboard blank cut and scored from which either the top or bottom half of the carton can be made.

FIG. 5 is a perspective view of a stack of cartons embodying the features and illustrating one aspect of the utility fo the instant invention.

According to the present invention, there is provided a telescoping carton assembly comprising two open top rectangular boxes of paper board, or equivalent carton stock, one box being slightly larger to function as a telescoping cover over the other box and each box having on at least one end thereof an easy-opening folded-flap closed end, the easy-opening flaps of the cover box being externally temporarily closed by adhesive tape strip or similar severable securing means and the other end of each box being closed as by interlocking folds or by an adhesive or both.

Both boxes are formed from blanks of flat sheet stock, die-cut to provide opposite side flaps and opposite end flaps. The side flaps extend along the length of the sheet and are folded at right angles to form the sides of the box. The length of the side flaps provides for an extension or tab on each end thereof for folding about the respective ends of the box. The end flaps do not extend the full width of the blank but are cut to a width equal to the width of the completed box. The end flaps are folded at right angle to form the ends of the box and each bear against the tabs or extensions of the side flaps.

One end each of the cover box and of the base box are suitably locked in position as by adhesives, staples or infolding. The other end of the base box is not locked, the flaps being merely folded in place. The other end of the cover box is secured in position by strips of adhesive tape extending about the end corners.

When the cover box is telescoped over the base box, the tape secured end of the cover box prevents opening of the unlocked folded ends of the base box.

The telescopic shipping carton of this invention provides flexibility in height dimensions, thus permitting the packaging therein of various sizes and quantities of casings. This has reduced the total number of carton sizes necessary to keep the previously mentioned manufacturer's inventory from the more than 100 items previously stocked, to about one half that number.

However, the use of a telescoping carton comprising a cover and a base box led to the development of a new system for exposing the contents of said cartons while in the warehouse. Normally, such a carton has to be exposed from the top so that the cover portion can be removed. Obviously, such a system is unsatisfactory where many cartons are stacked in piles and various cartons in the stock must be periodically opened to give access to different size casings.

The "easy-open" end for the telescoping carton to facilitate access to the contents particularly when the cartons are stacked and without removal of the carton from the stack, is readily provided for in cutting and folding the corrugated board of the carton in such a manner as to permit closure by folding and sealing said end with three pieces of ¾" pressure sensitive tape. Such tapes may be severed at designated positions on the carton, thus permitting easy opening and access to the interior package by the user without removing the complete carton from a stack.

Referring to FIGS. 1–3, a carton incorporating these novel features is clearly shown. FIG. 1 shows the cover box 10 and the base box 12 assembled and ready for filling. FIG. 2 shows the carton of FIG. 1 after it has been filled and sealed with pressure sensitive adhesive strips 26, 28 and 32 in place. FIG. 3 shows the carton after it has been opened by cutting the pressure sensitive strips 26 and 28. The two end flaps 24 and the four side tabs 22 are easily folded out of the way after the strips have been cut. It will be noted that the same numerals have been used to identify similar portions of both the base box 12 and the cover box 10 in all the figures since the parts are substantially identical in both size and shape. It is to be understood, however, that the dimensions of a given cover portion would be slightly larger than those of the corresponding body portion to allow a telescoping fit.

FIG. 4 shows the details of an exemplary blank from which the cover box and the base box 12 of the instant carton is constructed. The blank comprises a bottom panel 14, two side flaps 16 each having two side tabs 22, the locking end flap 18 with locking flap 20 thereon, and the easy open end flap 24. Scoring lines may be provided to facilitate the folding of both the side and end flaps and also the side tabs. When the blank is assembled the side flaps 16 are folded upwardly 90° from the bottom panel 14 and the tabs 22 folded in 90°. Then the locking end flap 18 is folded up 90° from the bottom panel 14 and flap 20 is folded 180° over the two tabs 22 adjacent thereto. The easy-open end flap 24 is then folded up 90°

FIG. 1 shows such an assembled box with locking tab 20 frictionally engaging the inside of the side flaps 22 to lock the end of the carton in position. Assuming this carton half to be the base box, it is then filled with casings and a similarly assembled cover box is telescoped over the body portion. The easy-open end portion of the cover box is then locked in position by the adhesive strips 26.

As shown in FIG. 2, when the cover box 10 is in place on the base box 12 and telescoped as far as the contents within the carton permit, additional adhesive strips 32 are affixed to the carton extending from the side flaps and locked end flap of the cover portion to the bottom panel of the body portion thus securing the two portions together. It will be noticed from FIG. 2 that an additional adhesive strip 28 may be affixed to the easy-open end flap of the cover portion and extended to the underside of the bottom panel 14 of the base box 12 to more firmly secure the easy-open end of the carton. Thus, when the carton is closed the easy opening end of the base box 12 is locked in place by the superimposed cover box 10 whose easy-open end is held closed by adhesive strips 26 extending from the easy-open end flap 24 to the two adjacent side flaps 16. While in the preferred embodiment of the invention, the closed easy-open end of the cover box is the sole means by which the easy-open end of the base box is held closed, the base box could be additionally secured at its easy-open end for convenience of filling and the like by small staples, etc., without departing from the spirit of the invention.

While the easy-open end has been shown at only one end of the carton, it is to be understood that such could be used at both ends of the carton without departing from the spirit and scope of the invntion. Also, any appropriate girth wrapping or securing means as wire, metal strap or rope, could be used to secure the cover and base box together in place of adhesive strups 32. However, these securing means would have to be laterally wrapped around the carton so as not to interfere with the easy-open end.

The filled carton as shown in FIG. 2 is then ready for shipment to consumers. To open the carton the only seals that have to be severed are the two or three adhesive strips 26 and 28 holding the easy open end shut. When these are severed the end of the carton is opened as shown in FIG. 3 and the contents 60 can be easily withdrawn. It is to be understood that the tapes are severed at point 50 of adhesive strip 26 where the end flap 24 abuts the side flaps 16 and at point 52 of adhesive strip 28 along the lower edge of cover box end flap 24.

FIG. 5 illustrates how the cartons can be stacked in a warehouse and how all or part of the contents 60 of any specific carton can be removed without moving either the carton or its neighbors from the stack.

There has thus been described a novel carton which combines the advantages of readily adapting to varying load and size and also providing an easy-open feature which greatly improves consumer warehousing techniques.

The carton may be made from any of the readily available "paper board" materials such as double faced corrugated fibreboard, solid fibreboard, chipboard, and laminated kraft-chipboard.

While certain novel features of the invention have been disclosed and pointed out in the annexed claims, it is to be understood that various omissions, changes and substitutions could be made by those skilled in the art without departing from the spirit and scope of the invention.

What is claimed is:

1. A telescoping carton assembly comprising two rectangular cover and base boxes of a semi-rigid foldable material, the cover box being of slightly larger dimensions than the base box to allow a close telescoping fit thereover, each box having on at least one end thereof a closed end of easy-opening folded flaps, formed by a folded end flap and a tab extension on each side flap the easy-opening folded flaps of the cover box being held in closed position by severable adhesive strips and the easy-opening folded flaps of the base box being essentially held in closed position by the closed end of easy-opening folded flaps of the cover box telescoped thereover.

2. A telescoping carton having one end thereof formed of folded flaps formed by a folded end flap and a tab extension on each side flap which can be unfolded to enable removal of contents packaged therein and thereafter refolded to close said end for protection of the remaining contents, said carton comprising a base box and a cover box having a telescopic fit over the base box, each box being formed from a blank having end flaps and side flaps, one end flap of each box being locked to the adjacent side flaps to form one vertical end wall and the two side walls, the other end flap of the base box forming the other vertical end wall and being in an unlocked folded position, and with the other end flap of the cover box being folded to form a vertical end wall and secured in its folded position by severable adhesive tapes, the assembled carton having the unlocked folded end of the base box adjacent to the tape secured end of the cover box.

3. A telescoping carton having a base box and a cover box telescoping thereon, both the base box and the cover box portions being formed from blanks having end flaps and side flaps provided with side tabs, each box having one end flap and the side flaps locked in assembled position and the opposite end formed by a folded end flap and a tab extension on each side flap held in assembled position by external means, the locked ends of each box being adjacent one another when the cover box is telescoped over the base box and wherein the external means for holding the opposite end of the cover box in assembled position comprises strips of adhesive material each extending from one side flap to said opposite end flap, the external means for holding the opposite end of the base box in assembled position being the assembled opposite end of the cover box telescoping thereover, and closure means for the carton comprising a plurality of adhesive strips extending from the bottom panel of the base box to the side flaps and locked end flap of the cover box.

4. A telescoping carton having a base box and a cover box telescoping thereon, both the base box and the cover box portions being formed from blanks having end flaps and side flaps provided with side tabs, each box having one end flap and the side flaps locked in assembled position and the opposite end held in assembled position by external means, the locked ends of each box comprise a portion of the respective end flaps folded over the inturned tabs on the side flaps thereby holding same in position, said folded over portion being held in place by frictional engagement with the upturned side flaps with the locked ends of each box being adjacent one another when the cover box is telescoped over the base box and wherein the external means for holding the opposite end of the cover box in assembled position comprises strips of adhesive material each extending from one side flap to said opposite end flap, the external means for holding the opposite end of the base box in assembled position being the assembled opposite end of the cover box telescoping thereover, and securing means for the carton comprising a plurality of adhesive strips extending from the bottom panel of the base box to the side flaps and end flaps of the cover box.

References Cited in the file of this patent
UNITED STATES PATENTS

| | | |
|---|---|---|
| 467,336 | Munson | Jan. 19, 1892 |
| 474,610 | Scott | May 10, 1892 |
| 1,544,499 | Sunderman | June 20, 1925 |
| 1,905,992 | Bogren | Apr. 25, 1933 |
| 1,936,136 | Lindgren | Nov. 21, 1933 |
| 2,288,739 | Peters | July 7, 1942 |
| 2,540,480 | Gibson | Feb. 6, 1951 |
| 2,740,547 | Huntting | Apr. 3, 1956 |
| 2,765,973 | Goldstein | Oct. 9, 1956 |
| 2,955,000 | Vohden | Oct. 4, 1960 |